United States Patent
Moon et al.

(10) Patent No.: US 11,175,212 B2
(45) Date of Patent: Nov. 16, 2021

(54) MID-INFRARED SCANNING SYSTEM FOR ANALYZING PARTICULATES

(71) Applicant: Agilent Technologies, Inc., Santa Clara, CA (US)

(72) Inventors: Christopher Ryan Moon, Los Gatos, CA (US); Andrew Ghetler, San Jose, CA (US); Matthew Kole, Santa Clara, CA (US)

(73) Assignee: Agilent Technologies, Inc., Santa Clara, CA (US)

( * ) Notice: Subject to any disclaimer, the term of this patent is extended or adjusted under 35 U.S.C. 154(b) by 0 days.

(21) Appl. No.: 16/777,847

(22) Filed: Jan. 30, 2020

(65) Prior Publication Data

US 2020/0309669 A1 Oct. 1, 2020

Related U.S. Application Data

(60) Provisional application No. 62/827,100, filed on Mar. 31, 2019.

(51) Int. Cl.
*G01J 5/02* (2006.01)
*G01N 15/14* (2006.01)
(Continued)

(52) U.S. Cl.
CPC ..... *G01N 15/1434* (2013.01); *G01N 15/1425* (2013.01); *G01N 15/1429* (2013.01);
(Continued)

(58) Field of Classification Search
CPC .......... G01N 15/1434; G01N 15/1425; G01N 15/1429; G01N 2015/0046;
(Continued)

(56) References Cited

U.S. PATENT DOCUMENTS 6,274,871 B1 * 8/2001 Dukor .................. G01J 3/45
250/339.08
7,701,573 B2 * 4/2010 Cohen ............... G01N 21/6458
356/326

(Continued)

FOREIGN PATENT DOCUMENTS

| CN | 109238946 A | 1/2019 |
|---|---|---|
| EP | 3001179 A2 | 3/2016 |

OTHER PUBLICATIONS

International Search Report dated May 15, 2020, PCT/US2020/015975.

(Continued)

*Primary Examiner* — Kiho Kim

(57) ABSTRACT

An apparatus and method for analyzing particulates in a sample is disclosed. The method includes placing the sample on a moveable stage in an apparatus having a tunable MIR light scanner and a visible imaging system, the stage moving between the MIR light scanner and the visible imaging system, providing a visible image of the sample, and receiving user input as to a region of the sample that is to be analyzed. The sample is then moved to the MIR light scanner, the MIR light scanner generating an MIR light beam that is focused to a point on the specimen and measuring light reflected from the specimen. The specimen is then scanned at a first MIR wavelength by moving the specimen relative to the MIR light beam, and particles are identified that meet a selection criterion. The MIR absorption spectrum of each of the identified particle is then automatically measured.

12 Claims, 3 Drawing Sheets

(51) Int. Cl.
*G06K 9/00* (2006.01)
*G06T 7/00* (2017.01)

(52) U.S. Cl.
CPC ........ *G06K 9/00127* (2013.01); *G06T 7/0012* (2013.01); *G06T 2200/24* (2013.01); *G06T 2207/10048* (2013.01); *G06T 2207/10056* (2013.01); *G06T 2207/30024* (2013.01)

(58) Field of Classification Search
CPC ... G01N 2015/0053; G01N 2201/1042; G01N 15/0612; G01N 21/3563; G06K 9/00127; G06T 7/0012; G06T 2200/24; G06T 2207/10048; G06T 2207/10056; G06T 2207/30024
USPC .................................................... 250/339.07
See application file for complete search history.

(56) References Cited

U.S. PATENT DOCUMENTS

| | | | | |
|---|---|---|---|---|
| 7,889,348 B2* | 2/2011 | Tearney | ............. | G01N 21/6456 356/451 |
| 2007/0091428 A1* | 4/2007 | Wilson | ................ | G02B 21/365 359/391 |
| 2008/0165344 A1* | 7/2008 | Treado | ................. | G01J 3/0278 356/72 |
| 2011/0264411 A1* | 10/2011 | Yang | .................... | A61B 5/1455 702/190 |
| 2012/0092476 A1* | 4/2012 | Diamant | ................ | H04N 19/17 348/79 |
| 2014/0028854 A1* | 1/2014 | Heinke | ................. | G01J 5/0265 348/164 |
| 2015/0131098 A1* | 5/2015 | Yang | .................. | A61B 5/14539 356/402 |
| 2016/0091704 A1* | 3/2016 | Hoke | ....................... | H04N 5/33 348/79 |
| 2016/0098590 A1* | 4/2016 | Bredno | ..................... | G06T 7/11 382/133 |
| 2016/0110584 A1* | 4/2016 | Remiszewski | ..... | G06K 9/00127 382/133 |
| 2016/0373663 A1* | 12/2016 | Ghetler | .............. | G01N 21/9501 |
| 2017/0082538 A1* | 3/2017 | Hoke | ................... | G01N 21/552 |
| 2018/0120214 A1* | 5/2018 | Kato | ...................... | G01N 15/10 |
| 2018/0299374 A1* | 10/2018 | Holman | ............ | G01N 21/3563 |
| 2018/0313804 A1* | 11/2018 | Rogel-Castillo | ....... | G01N 21/95 |
| 2019/0257723 A1* | 8/2019 | Rowlette | ................ | G01N 1/286 |

OTHER PUBLICATIONS

Kappler, et al., Analysis of Environmental Microplastics by Vibrational Microspectroscopy: FTIR, Raman or Both?, anal Bioanal Chem., Oct. 8, 2016.

* cited by examiner

MID-INFRARED SCANNING SYSTEM FOR ANALYZING PARTICULATES

CROSS-REFERENCE TO RELATED PATENT APPLICATIONS

This application claims priority from U.S. Provisional Application 62/827,100 filed on Mar. 31, 2019, said patent application being incorporated by reference herein.

BACKGROUND

Quantum cascade lasers provide a tunable mid-infrared (MIR) light source that can be used for spectroscopic measurements and images. Many chemical components of interest have molecular vibrations that are excited in the MIR region of the optical spectrum, which spans wavelengths between 5 to 25 microns. Hence, measuring the absorption of MIR light at various locations on a sample can provide useful information about the chemistry of the sample. Plastic particles are an environmental problem that pose challenges for instruments that are used to detect and measure such particles.

SUMMARY

The present invention includes an apparatus and method for analyzing particulates in a sample. The method includes placing the sample on a moveable stage in an apparatus having a tunable MIR light scanner and a visible imaging system, the moveable stage moving between the MIR light scanner and the visible imaging system, and providing a visible image of the sample and receiving user input as to a region of the sample that is to be analyzed.

The sample is then moved to the MIR light scanner, the MIR light scanner generating an MIR light beam that is focused to a point on the specimen and measuring light reflected from the specimen. The specimen is then scanned at a first MIR wavelength by moving the specimen relative to the MIR light beam, and particles are identified that meet a selection criterion. The MIR absorption spectrum of each of the identified particle is then automatically measured.

In one aspect, the specimen is scanned at a second MIR wavelength and the selection criterion utilizes absorption at both the first and second MIR wavelengths to select the particles.

In one aspect, the user selects the first MIR wavelength based on a type of material of the particles of interest.

In one aspect, the apparatus determines an amount of light absorbed by each identified particle and an amount of light scattered by that particle.

In one aspect, the apparatus includes a spectrum library includes an MIR absorption spectrum for each of a plurality of materials.

The apparatus includes a visible imaging system, an MIR imaging system, and a controller. The visible imaging system forms an image of a sample on a stage.

The MIR imaging system generates a MIR light beam, focuses the MIR light beam to a point on the sample, and measures an amount of the MIR light beam that is absorbed by the sample, the stage is moveable between the visible imaging system and the MIR imaging system.

The controller forms a visible image of the sample and is adapted for receiving user input as to a region of the sample that is to be analyzed and moves the sample to the MIR light scanner. The controller causes the MIR imaging system to scan the specimen at a first MIR wavelength by moving the specimen relative to the MIR light beam. The controller identifies particles seen at the first MIR wavelength that meet a selection criterion; and then automatically measures an absorption MIR spectrum of each identified particle.

In one aspect, the controller causes the specimen to be scanned at a second MIR wavelength and the selection criterion utilizes absorption at both the first and second MIR wavelengths to select the particles.

In one aspect, the controller is adapted to receive user input with respect to the first MIR wavelength based on a type of material of the particles of interest.

In one aspect, the controller determines an amount of light absorbed by each identified particle and an amount of light scattered by that particle.

In one aspect, the apparatus includes a spectrum library includes an MIR absorption spectrum for each of a plurality of materials.

DETAILED DESCRIPTION

The manner in which the present invention provides its advantages can be more easily understood with reference to the problem of identifying microscopic particles of plastics in the effluent from a water treatment plant. To assay for the particles, a water sample is first filtered to concentrate the particular matter and then collected material is presented on a microscope slide for analysis. The slide will contain a variety of particles, many of which are of little interest. For example there may be cellulose particles resulting from paper that was not completely digested. To distinguish between particles of interest in such background articles, an absorption spectrum in the MIR must be generated for each particle.

The present invention utilizes a scanning apparatus that includes an optical microscope for locating regions of interest of the slide and a MIR scanner that scans the slide with a focused MIR laser beam and measures the amount of light that is absorbed or scattered by the material at each point at which the beam is focused. The wavelength of the laser beam can be varied over a wide range of MIR wavelengths, and hence, and an absorption spectrum can be generated for each point on the slide.

Figure 1:
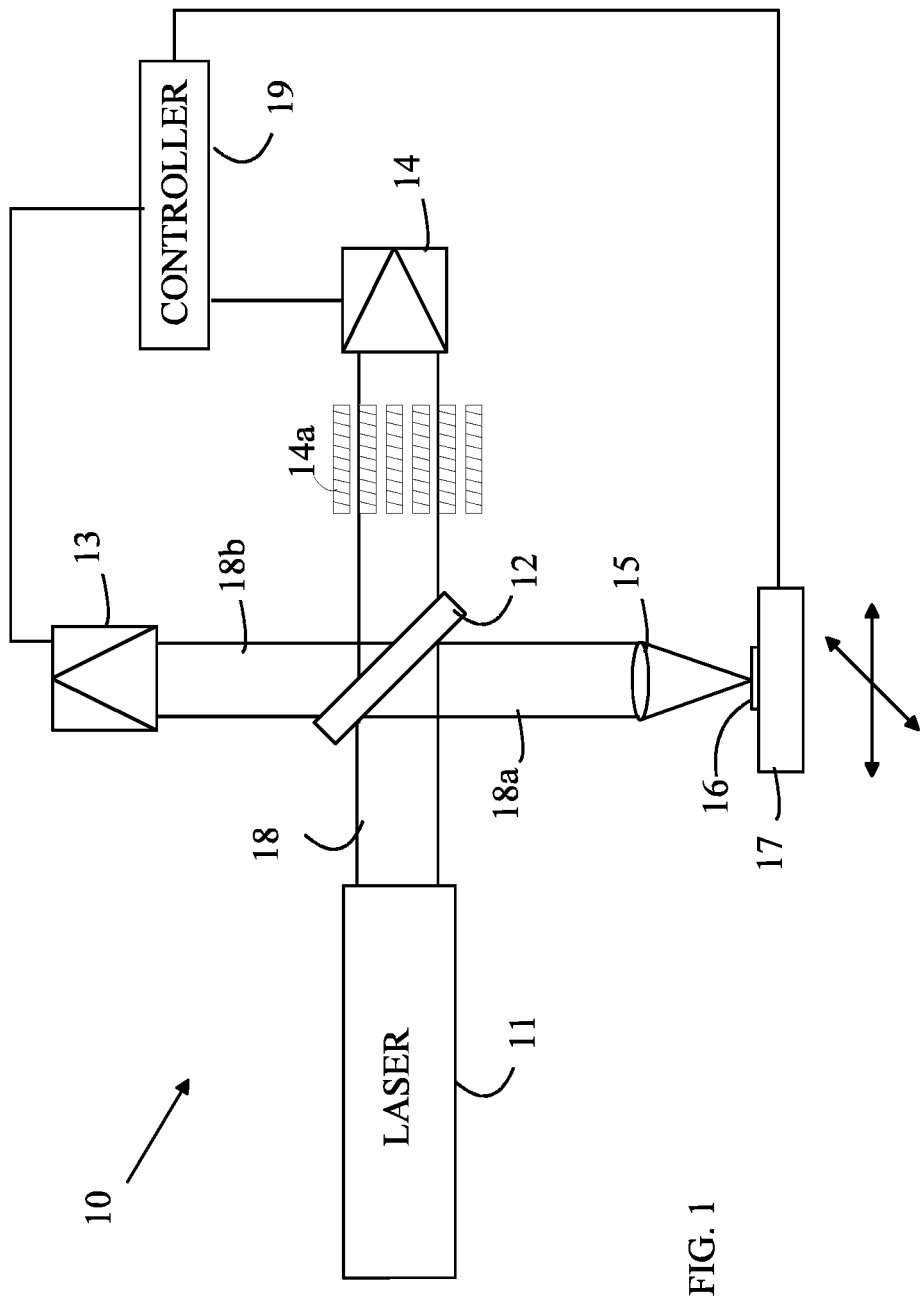
FIG. 1 illustrates the basic elements of a MIR imaging system that can be used to scan and measure the absorbance of a sample.

Refer now to FIG. 1, which illustrates the basic elements of a MIR imaging system that can be used to scan and measure the absorbance of a sample. Imaging system 10 includes a quantum cascade laser 11 that generates a collimated light beam 18 having a narrow band of wavelengths in the MIR. In one aspect, laser 11 is a quantum cascade laser having a tunable wavelength that is under the control of a controller 19. Collimated light beam 18 is split into two beams by a partially reflecting mirror 12. Light beam 18a is directed to a lens 15 that focuses that beam onto a specimen that is on a slide 16 that is mounted on xy-stage 17 that can position slide 16 relative to the focal point of lens 15. Light that is reflected back from slide 16 is collimated into a second beam that has a diameter determined by the aperture of lens 15 and returns to partially reflecting mirror 12 along the same path as light beam 18a. While the first and second beams are shown as having the same cross-section in FIG. 1, it is to be understood that the second beam could have a different cross-section than the first beam. A portion of the second beam is transmitted through partially reflecting mirror 12 and impinges on a first light detector 13 as shown at 18b. Detector 13 generates a signal related to the intensity of light in beam 18b. Controller 19 computes an image as a function of position on slide 16 by moving slide 16 relative to the focal point of lens 15 using xy-stage 17.

Controller 19 also monitors the beam intensity of the light in collimated light beam 18 using a second light detector 14 that receives a portion of the light generated by quantum cascade laser 11 through partially reflecting mirror 12 and directional filter 14A. Quantum cascade laser 11 is typically a pulsed source. The intensity of light from pulse to pulse can vary significantly, and hence, the pixels of the image are corrected for the variation in intensity by dividing the intensity measured by detector 13 by the intensity measured by detector 14. In addition, since the light intensity from quantum cascade laser 11 is zero between pulses, controller 19 only sums the ratio of intensities from detectors 13 and 14 during those times at which the output of detector 14 is greater than some predetermined threshold.

To provide an absorption measurement, the backside of slide 16 is covered with a reflective material so that light returned to detector 13 has passed through the specimen twice.

In the scanner shown in FIG. 1, the stage moves the sample in two dimensions. However, the stage has a significant mass, and hence, the speed at which the sample is imaged is limited by the motion of the stage. To scan a significant fraction of the entire microscope slide, this speed limitation presents challenges.

Figure 2:
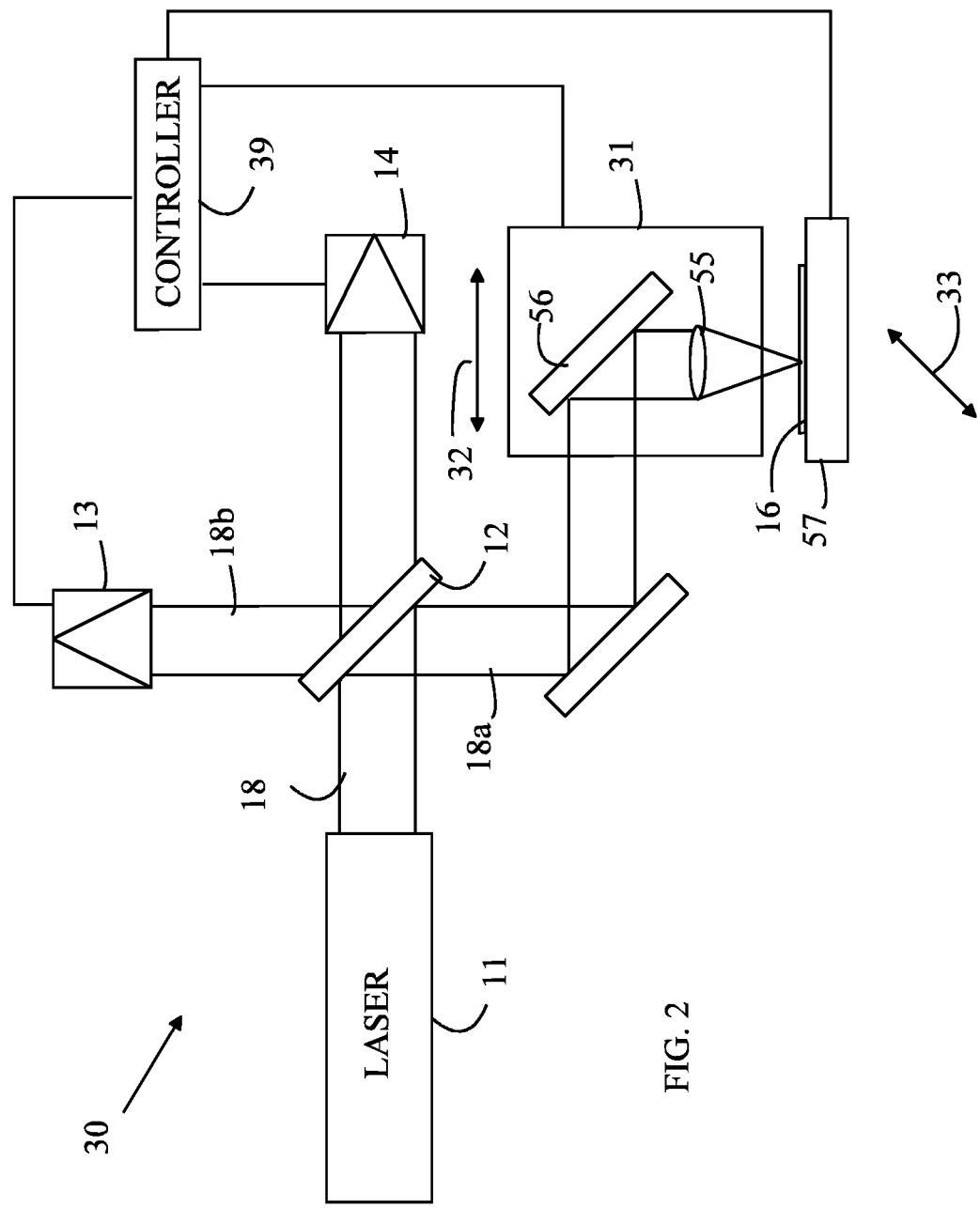
FIG. 2 illustrates an imaging system with improved scanning speed.

Refer now to FIG. 2, which illustrates an imaging system with improved scanning speed. In imaging system 30, the stage assembly is divided into two components. Component 31 includes focusing lens 55 and is moveable in a direction shown at 32 such that a single line of the image is generated with each pass of component 31. Since focusing lens 55 and mirror 56 have a mass that is small compared to component 57, component 31 can be moved with much greater speed. In one embodiment, component 31 is mounted on a rail and moved in a manner analogous to a print head on an inkjet printer. The second component of the stage assembly is shown at 57. Component 57 includes the mounting mechanism for the specimen being scanned and moves in a direction 33 that is orthogonal to direction 32. Since component 57 only needs to move once per scan line, the slower speed of motion associated with the more massive component 57 is acceptable. In one aspect, component 57 moves continuously at a speed that is adjusted to that of component 31. Controller 39 provides functions analogous to those of controller 19 discussed above.

It is advantageous to provide an additional scanning station that provides an image of the specimen in the optical wavelengths so that a user can view the specimen and specify a region of interest on the slide that is to be analyzed for particles of the desired material. The visible light imaging system provides a number of useful functions. First, the visible light system allows a user to pick a region on a specimen to scan using the MIR scanning system. Second, the dual system can provide a compound image in which the MIR image is superimposed on the visible light image.

Figure 3:
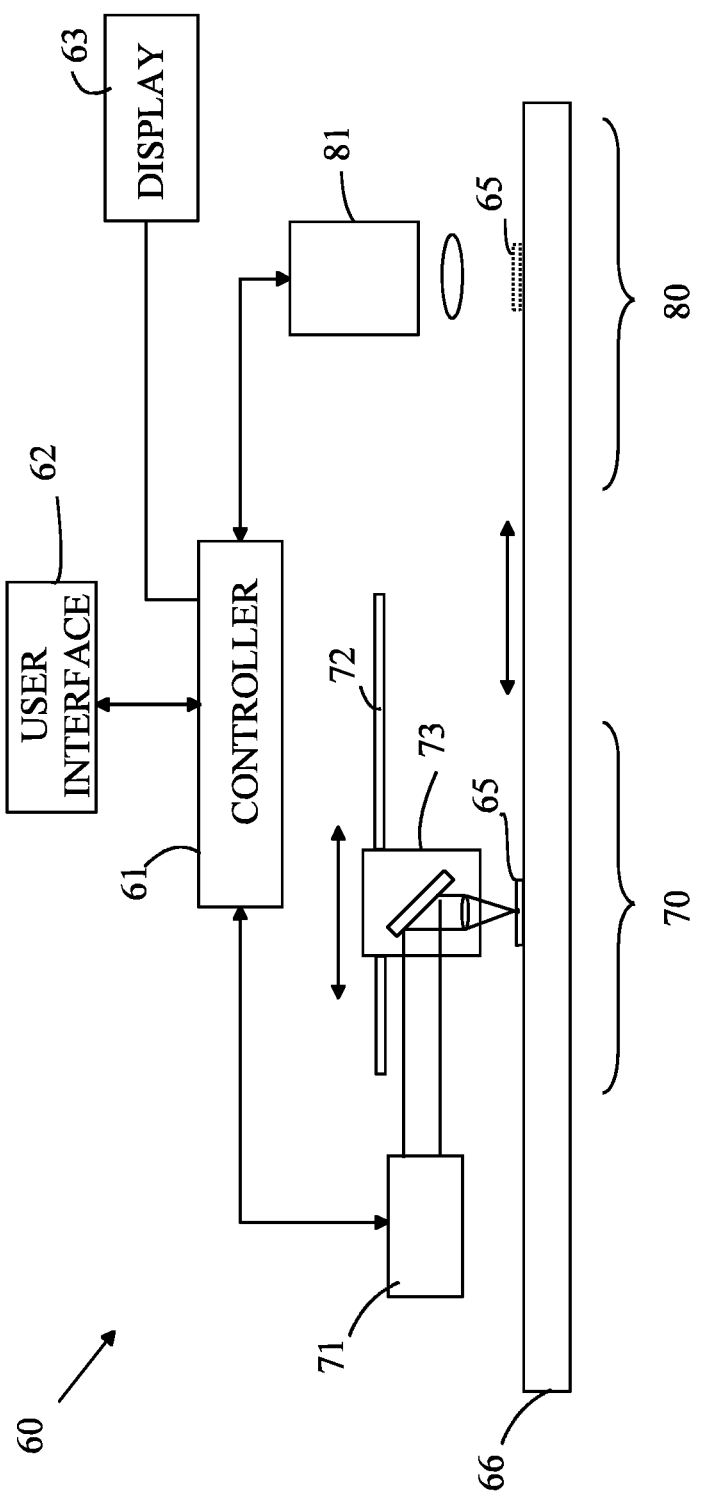
FIG. 3 illustrates another embodiment of a MIR imaging system having a dual imaging station configuration.

Refer now to FIG. 3, which illustrates another embodiment of a MIR imaging system having such a dual imaging station configuration. Imaging system 60 includes a MIR imaging system 70 and a visible light imaging system 80 having an imaging array 81 that is responsive to light in the visible wavelengths. Both systems are under the control of controller 61. The two imaging systems share a stage 66 that allows a specimen 65 to be moved between the imaging systems such that an area defined using visible light imaging system 80 can be positioned for scanning using MIR imaging system 70. MIR imaging system 70 includes a scanning head 73 that moves on a rail 72 under the control of controller 61 in a manner analogous to that described above with respect to imaging system 30 shown in FIG. 2. Stage 66 allows the specimen to be moved in a direction perpendicular to the direction of travel of scanning head 73 so that a two-dimensional image can be generated. To simplify the drawing, the laser and associated optics in MIR imaging system 70 are shown as a single block 71.

In practice, a user places specimen 65 in position under visible light imaging system 80 and indicates which portion of specimen 65 is to be scanned using a user interface 62 and display 63. The user can indicate the desired area using a point device or similar apparatus. The visible image is generated using an objective lens that provides the desired level of magnification. Controller 61 then computes the distance specimen 65 must be moved to be properly aligned with MIR imaging system 70. Specimen 65 is then moved and scanned as described below. Controller 61 then scales the scanned image to the correct magnification and generates a compound image consisting of the visible light image and the MIR image.

The analysis method of the present invention starts by the user viewing the slide in the optical microscope and picking out a region of interest using an appropriate pointing device. The region should be chosen such that the particles are separated from one another. Once a region has been defined, the slide is moved to a location in the infrared scanning area, and the slide is scanned at a first wavelength that is chosen because the material of interest is a strong absorption at that wavelength.

It should be noted that the light returned by the specimen reflects light that was lost from the incident beam. That light loss could be the result of absorption or scattering. Accordingly, in one aspect of the invention, the specimen is also scanned at a second wavelength that is chosen to be a wavelength at which the specimens of interest do not have significant absorption. Denote the quantity $1-f$, where f is the fraction of the light returned from the specimen, as the "apparent absorption". The apparent absorption is the sum of the real absorption and the scattering. Hence, the apparent absorption at the second wavelength can be used to correct the apparent absorption at the first wavelength for the scattering produced by the particle. Ideally, the second wavelength is chosen such that the particle of interest has no absorption at that wavelength. In such a case, the apparent absorption at the first wavelength can be corrected for scattering by subtracting the apparent absorption at the second wavelength. In the more general case, the correction can be provided by solving two simultaneous equations.

Given the corrected scan of the region of interest, a list of the locations of the potential particles of interest is generated. In one aspect, the list is ordered such that the travel time of the stage between successive particles in the list is minimized. Each particle in the list is then scanned at a plurality of wavelengths to provide an absorption spectrum as a function of wavelength for that particle. The controller stores a library of absorption spectra for materials of interest.

The controller matches the observed spectrum with the spectrum in the library to identify the material of each particle.

The apparent absorption spectrum of each particle can be corrected for scattering once an identification of the material of the particle is obtained. In one aspect, the scattering is also recorded for each particle. The scattering is a measure of the surface topology of the particle.

In the above-described embodiments, particles of interest are identified by the infra-red absorption spectrum of the particles and particles that were unlikely to be composed of the materials of interest were ignored. However, the present invention can be used to facilitate the analysis of other particles by eliminating the particles of known composition and mapping the locations of the unknown particles. The unknown particles can then be analyzed by other techniques.

The above-described embodiments of the present invention have been provided to illustrate various aspects of the invention. However, it is to be understood that different aspects of the present invention that are shown in different specific embodiments can be combined to provide other embodiments of the present invention. In addition, various modifications to the present invention will become apparent from the foregoing description and accompanying drawings. Accordingly, the present invention is to be limited solely by the scope of the following claims.

What is claimed is:

1. A method for analyzing particulates in a sample, said method comprising: placing said sample on a moveable stage in an apparatus having a tunable MIR light scanner and a visible imaging system, said moveable stage moving between said MIR light scanner and said visible imaging system; providing a visible image of said sample and receiving user input as to a region of said sample that is to be analyzed; moving said sample to said MIR light scanner, said MIR light scanner generating an MIR light beam that is focused to a point on said specimen and measuring light reflected from said specimen; scanning said specimen at a first MIR wavelength by moving said specimen relative to said MIR light beam; identifying particles seen at said first MIR wavelength that meet a selection criterion; automatically measuring an absorption MIR spectrum of one of said identified particles, said absorption MIR spectrum being corrected for scattering of said one of said identified particles at a wavelength in said MIR spectrum by measuring an MIR absorption at an MIR wavelength at which said one of said identified particles does not absorb light of that MIR wavelength.

2. The method of claim 1 wherein said specimen is scanned at a second MIR wavelength and said selection criterion utilizes absorption at both said first and second MIR wavelengths to select said particles.

3. The method of claim 1 wherein said user selects said first MIR wavelength based on a type of material of said particles of interest.

4. The method of claim 1 wherein said apparatus determines an amount of MIR light absorbed by each identified particle and an amount of MIR light scattered by that particle.

5. The method of claim 1 wherein said apparatus includes a spectrum library comprising an MIR absorption spectrum for each of a plurality of materials.

6. The method of claim 1 wherein said absorption MIR spectrum is measured at said first MIR wavelength and is corrected by subtracting an apparent absorption at a second MIR wavelength.

7. An apparatus for analyzing particles, said apparatus comprising: a visible imaging system that forms an image of a sample on a stage; an MIR imaging system that generates an MIR light beam, focuses said MIR light beam to a point on said sample, and measures an amount of said MIR light beam that is absorbed by said sample, said stage being moveable between said visible imaging system and said MIR imaging system; a controller that forms a visible image of said sample and is adapted for receiving user input as to a region of said sample that is to be analyzed and moves said sample to said MIR light scanner; said controller scanning said specimen at a first MIR wavelength by moving said specimen relative to said MIR light beam, and identifying particles seen at said first MIR wavelength that meet a selection criterion; and said controller automatically measuring an absorption MIR spectrum of one of said identified particles said absorption MIR spectrum being corrected for scattering of said one of said identified particles at a wavelength in said MIR spectrum by measuring an MIR absorption at an MIR wavelength at which said one of said identified particles does not absorb light of that MIR wavelength.

8. The apparatus of claim 7 wherein said controller causes said specimen to be scanned at a second MIR wavelength and said selection criterion utilizes absorption at both said first and second MIR wavelengths to select said particles.

9. The apparatus of claim 7 wherein said controller is adapted to receive user input with respect to said first MIR wavelength based on a type of material of said particles of interest.

10. The apparatus of claim 7 wherein said controller determines an amount of MIR light absorbed by each identified particle and an amount of MIR light scattered by that particle.

11. The apparatus of claim 7 wherein said apparatus includes a spectrum library comprising an MIR absorption spectrum for each of a plurality of materials.

12. The apparatus of claim 7 wherein said absorption MIR spectrum is measured at said first MIR wavelength and is corrected by subtracting an apparent absorption at a second MIR wavelength.

* * * * *